No. 896,947.  
PATENTED AUG. 25, 1908.  
G. H. STALLMAN.  
PISTON.  
APPLICATION FILED NOV. 8, 1907.

WITNESSES

INVENTOR  
Granville H. Stallman  
by Chas. A. Cutter  
ATTORNEY

UNITED STATES PATENT OFFICE.

GRANVILLE H. STALLMAN, OF PHILADELPHIA, PENNSYLVANIA.

PISTON.

No. 896,947.　　　　Specification of Letters Patent.　　　Patented Aug. 25, 1908.

Application filed November 8, 1907. Serial No. 401,214.

*To all whom it may concern:*

Be it known that I, GRANVILLE H. STALLMAN, a citizen of the United States, and a resident of the city and county of Philadelphia, State of Pennsylvania, have invented certain new and useful Improvements in Pistons, of which the following is a specification.

My invention relates to improvements in pistons, and more particularly to improvements in the single-acting, self-adjusting, rodless pistons used in sausage stuffing machines, the object of my invention being to furnish a piston for this purpose, to be operated by compressed air preferably, the packing of which will on the operative stroke be expanded to make a perfectly air or liquid tight joint with the cylinder and on the return stroke, or as soon as the actuating pressure is relieved, will contract and permit a free falling of the piston.

Figure 1:
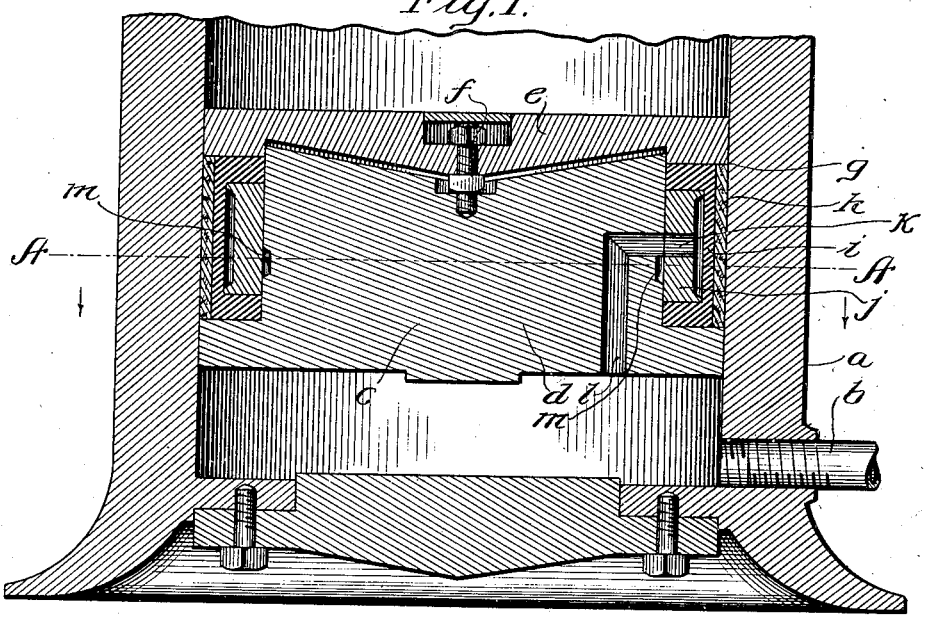
Figure 2:
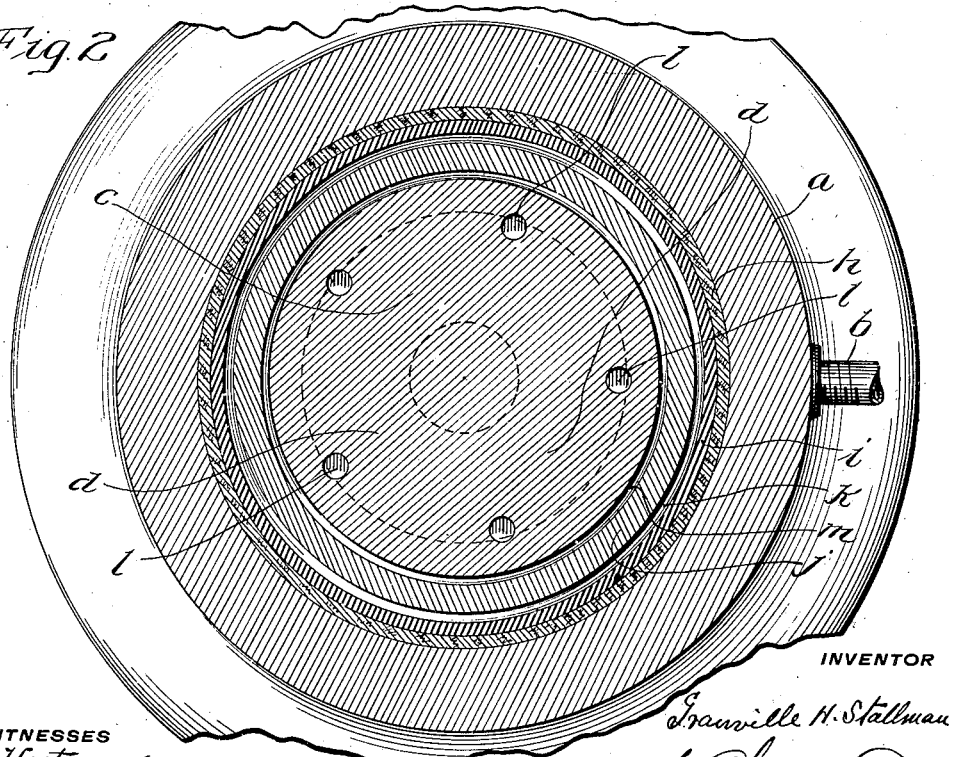

In the drawings, Figure 1 is a central sectional elevation of part of a cylinder fitted with my improved piston, and Fig. 2, a section of Fig. 1 on line A—A.

$a$ is a cylinder furnished at the lower end with an air or liquid entrance and exhaust $b$.

$c$ is the piston which is made in two parts, a main part $d$, and a top part $e$, which are, by means of a bolt $f$, adjustable towards or away from each other. Placed in a recess $g$ formed in the periphery of the piston is a packing $h$ which is adapted to engage the cylinder $a$. Immediately back of this packing is an elastic packing $i$, preferably constructed of rubber, which has a channel shape and in which is placed a ring $j$ which acts to keep the packing $i$ in shape and which is furnished with perforations $k$ which connect with passages $l$ in the main part $d$ of the piston, these passages being open to the air or liquid in the cylinder $a$.

When air or liquid is admitted to the bottom of the cylinder $a$ it acts against the bottom of the piston $c$ to lift it and at the same time it enters the passage, or passages $l$ and presses against the inner side of the elastic packing $i$ and forces this packing outwards causing the packing $h$ to bear tightly against the walls of the piston.

The area of the bearing surface of the packing $h$ against the cylinder is so large as to effectually prevent any leakage past it during the operation of the piston. As soon as the actuating pressure in the cylinder $a$ beneath the piston is relieved the pressure forcing the packing $h$ outward is withdrawn, the packings collapse, and the weight of the piston $c$ will cause it to drop to the bottom of the cylinder.

My device obviates the possibility of the piston sticking to the cylinder when the pressure in the latter is relieved.

The packings can be adjusted in relation to the cylinder by setting the part $e$ of the piston towards or away from the part $d$. If it be set closer it will compress the rubber ring $i$ edgewise and will cause it to force the packing $h$ outward. If it be set away the opposite will occur.

In order to provide against the possibility of the passage $l$ not meshing with the opening $k$ in the ring $j$, I furnish the part $d$ of the piston with a groove $m$ which engages or opens into the passage or passages $l$ and in case of the ring $j$ being set far down by adjusting the part $e$ of the piston tightly against the part $d$, would direct the air from the passage $l$ to the opening $k$.

Having thus described my invention I claim as new and desire to secure by Letters Patent:—

1. In a piston, in combination, a main part and a top part and means for adjusting said parts toward or away from one another, an elastic packing seated in an annular groove in the periphery of the piston and engaged at its ends by the main and top portions of said piston, said annular groove; a packing surrounding the outer face of said elastic packing adapted to engage the cylinder in which said piston works, and a connection leading from the pressure end of said piston to the rear of said elastic packing.

2. In a piston, in combination, a main part and a top part and means for adjusting said parts toward or away from one another, a channel shaped elastic packing seated in an annular groove in the periphery of said piston and engaged at its ends by the main and top portions thereof, said annular groove; a perforated annular ring in the channel of said elastic packing, a packing surrounding the outer face of said elastic packing, and a connection leading from the pressure end of said piston to the perforation in said ring.

GRANVILLE H. STALLMAN.

Witnesses:
GEORGE W. SELTZER,
CHARLES A. RUTTER.